Figure 1:
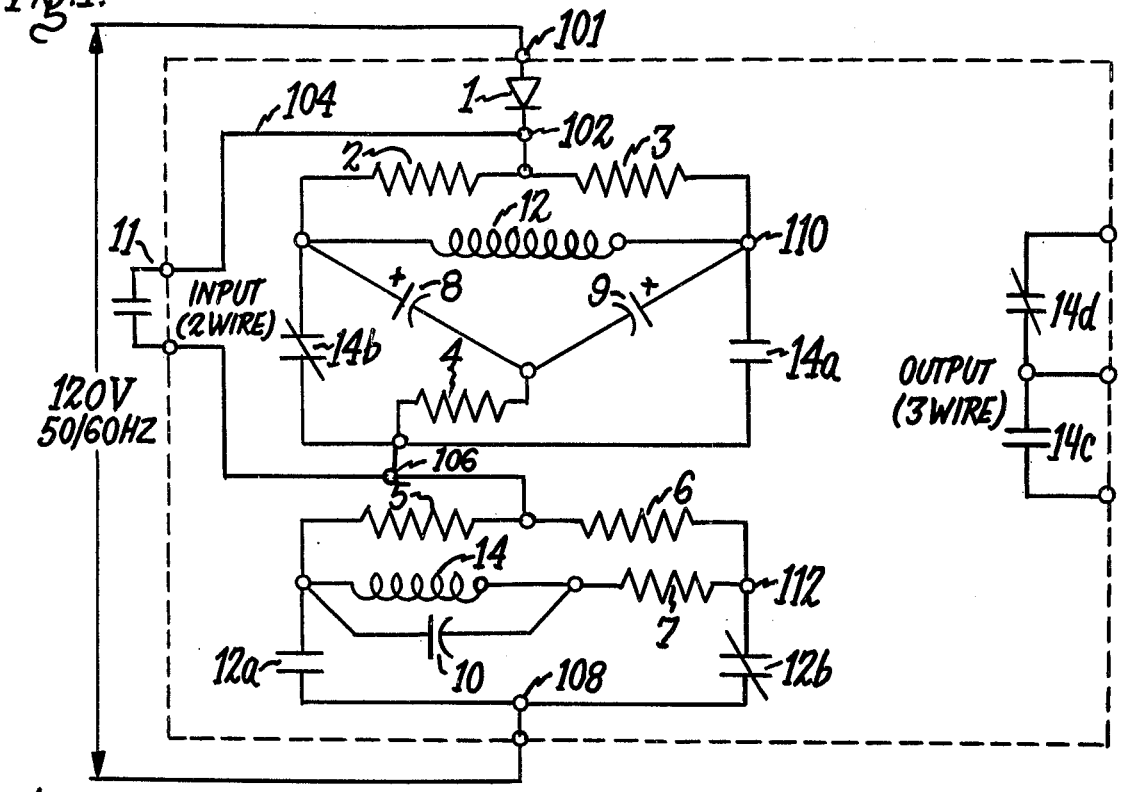
Figure 2:
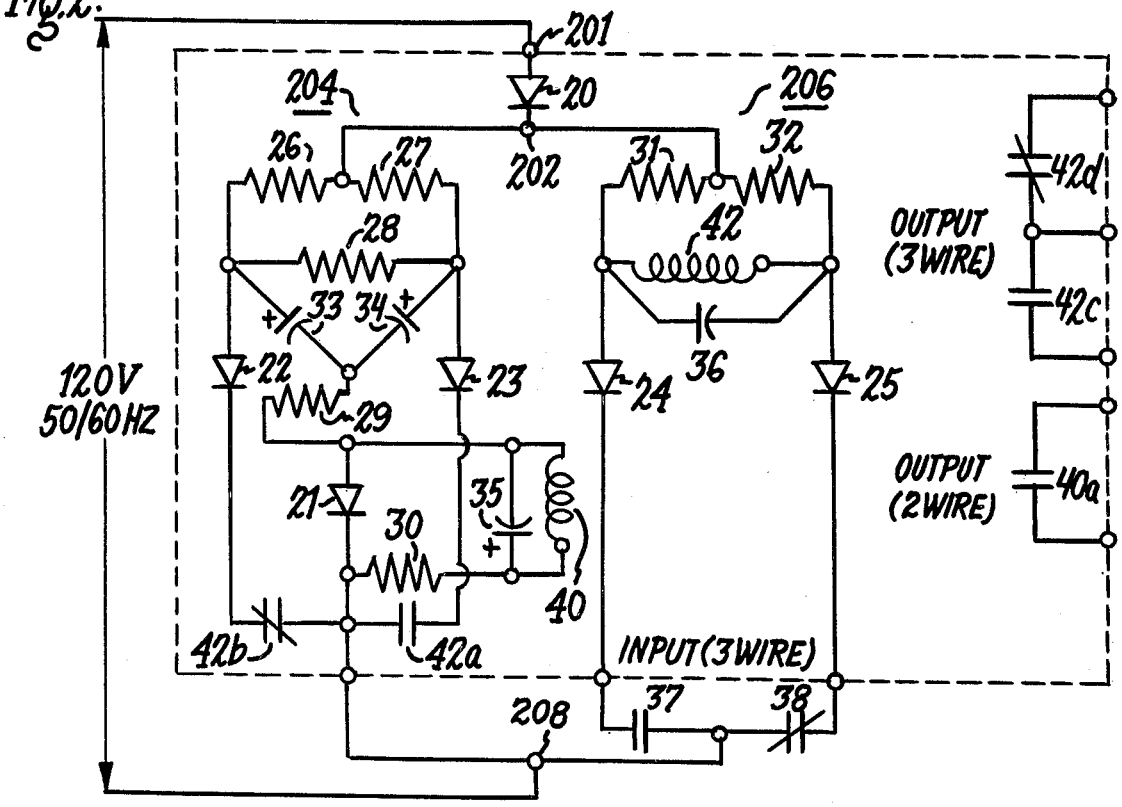

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 30

T945,005
CONVERSION RELAYS
Joseph G. Russillo, Dover, N.H., assignor to General Electric Company
Filed Jan. 22, 1975, Ser. No. 543,283
**Int. Cl. H01h *47/00***
U.S. Cl. 317—157
1 Sheet Drawing. 10 Pages Specification

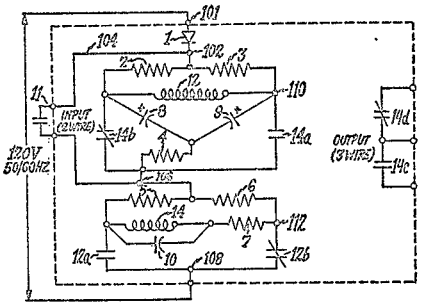

A conversion relay circuit converts a two-wire contact into a three-wire contact. Impulses generated by a local demand meter are propagated along a two-wire transmission line to a two-wire contact. The relay circuit is coupled between the two-wire contact and a three-wire impulse driven demand meter. The relay circuit comprises first and second bridge circuits each containing a mercury wetted relay. The direction of current through one relay is controlled by the contacts of the other. A short circuit is alternately opened and closed across the first bridge circuit in response to impulses received by the two-wire input contact. A three-wire output contact is controlled by the relay in the second bridge. Resistive elements in the two bridges are chosen to limit the current through and thereby prevent the activation of the second bridge relay when the input contact is open.

Another circuit converts a three-wire contact into a two-wire (or three-wire) conversion contact. That circuit is coupled between a three-wire local demand meter and a two-wire transmission line. It is also compatible with a three-wire impulse receiver, such as an impulse driven demand meter.

CONVERSION RELAYS

Original Filed Jan. 22, 1975